(12) United States Patent
Livitski

(10) Patent No.: US 9,494,402 B2
(45) Date of Patent: Nov. 15, 2016

(54) WELDING GAUGE

(71) Applicant: Johnathan Kenneth Livitski, Neebing (CA)

(72) Inventor: Johnathan Kenneth Livitski, Neebing (CA)

(*) Notice: Subject to any disclaimer, the term of this patent is extended or adjusted under 35 U.S.C. 154(b) by 119 days.

(21) Appl. No.: 14/162,120

(22) Filed: Jan. 23, 2014

(65) Prior Publication Data

US 2014/0230263 A1 Aug. 21, 2014

Related U.S. Application Data

(60) Provisional application No. 61/766,786, filed on Feb. 20, 2013.

(51) Int. Cl.
*G01B 5/00* (2006.01)

(52) U.S. Cl.
CPC .................... *G01B 5/0037* (2013.01)

(58) Field of Classification Search
CPC ........... G01B 5/0037; G01B 3/00; G01B 1/00; G01B 3/26; G01B 3/44; G01B 3/56; G01B 5/025; G01B 5/14
USPC .......... 33/471–473, 1 N, 465, 832–834, 613, 33/645
See application file for complete search history.

(56) References Cited

U.S. PATENT DOCUMENTS

| 2,389,842 | A | * | 11/1945 | Cummins | 33/833 |
| 3,154,861 | A | * | 11/1964 | Rubenstein | 33/662 |
| 4,485,558 | A | * | 12/1984 | Lycan et al. | 33/833 |
| 4,637,142 | A | * | 1/1987 | Baker | 33/833 |
| 5,337,489 | A | * | 8/1994 | Mustafa | 33/832 |
| 5,611,149 | A | * | 3/1997 | Fujiwara | 33/833 |
| 6,505,410 | B1 | * | 1/2003 | Lycan | 33/473 |
| 6,637,121 | B2 | * | 10/2003 | Barefoot | 33/501.45 |
| 6,981,332 | B2 | * | 1/2006 | Barefoot | 33/501.45 |
| 8,151,479 | B1 | * | 4/2012 | Carnegie | 33/555.2 |
| 2014/0230263 | A1 | * | 8/2014 | Livitski | 33/701 |
| 2015/0082646 | A1 | * | 3/2015 | Palynchuk et al. | 33/548 |

* cited by examiner

*Primary Examiner* — Yaritza Guadalupe-McCall
(74) *Attorney, Agent, or Firm* — Ryan W. Dupuis; Kyle R. Satterthwaite; Ade & Company Inc

(57) ABSTRACT

A gauge for measuring a weld between two abutted pipe sections has a unitary body including a reference edge for abut an outer surface of the pipe sections, a first gauge portion at a prescribed first distance from the reference edge corresponding to a minimum cap height of the weld, and a second gauge portion at a prescribed second distance from the reference edge corresponding to a maximum cap height of the weld. One or both ends of the body includes an end surface and a bevel surface at an obtuse angle to the end surface so as to be arranged to abut a bevel cut end of a pipe section when the end surface abuts the outer side of the pipe section to gauge an inclination of the bevel cut end. A measurement scale with an advance cut line extends along the body opposite from the reference edge.

14 Claims, 4 Drawing Sheets

WELDING GAUGE

This application claims the benefit under 35 U.S.C. 119(e) of U.S. provisional application Ser. No. 61/766,786, filed Feb. 20, 2013.

FIELD OF THE INVENTION

The present invention relates to a gauge for use in welding to measure that a butt weld between abutted pipe sections is within prescribed upper and lower limits. The present invention further relates to a welding gauge which can also gauge a pipe bevel and locate an advance cut location relative to an indicated pipe end.

BACKGROUND

When butt welding two sections of pipe, the ends of the pipe are typically bevelled so that the abutted pipe ends define an annular recess therebetween for receiving a weld. Typically the weld comprises a bead formed in a first pass, followed by fill, and completed with a cap at the exterior of the pipe. To ensure adequate strength of the weld, the bevels must be within a prescribed range and the finished height of the weld relative to the outer pipe walls, known as the cap height, must also be within a prescribed range.

Various gauges are known to assist a welder in measuring that the pipe ends are cut at an appropriate bevel before welding and to assist a welder in measuring that the cap height of the weld is suitable after welding. Examples of weld gauges are disclosed in U.S. Pat. No. 4,637,142 by Baker and U.S. Pat. No. 2,389,842 Cummins. In each instance the gauge includes multiple components which must be carefully calibrated for each use. The gauges are unnecessarily costly and complex to manufacture and are prone to errors if the movement components are not properly aligned.

U.S. Pat. No. 6,637,121 by Barefoot discloses a weld gauge for measuring an internal bead and is not relevant to cap height or bevel measurements.

SUMMARY OF THE INVENTION

According to one aspect of the present invention there is provided a gauge for use in measuring a weld between two abutted pipe sections, the gauge comprising:
  a unitary body comprising:
    at least one reference edge arranged for abutment along an outer surface of at least one of the pipe sections;
    a first gauge portion in fixed relation to said at least one reference edge and arranged to be located at a prescribed first distance from said at least one reference edge corresponding to a minimum cap height of the weld relative to the outer surface of the pipe sections;
    a second gauge portion in fixed relation to said at least one reference edge and arranged to be located at a prescribed second distance from said at least one reference edge corresponding to a maximum cap height of the weld relative to the outer surface of the pipe sections.

Preferably the unitary body comprises a single flat plate formed of a singular, integral and seamless material.

Preferably said at least one reference edge is linear along one side of the unitary body.

Preferably said at least one reference edge comprises a plurality of edge portions along a common linear side of the unitary body in which each gauge portion is located between a pair of the edge portions.

When the unitary body is elongate in a longitudinal direction, preferably said at least one reference edge is oriented in the longitudinal direction, and the first and second gauge portions are spaced apart from one another in the longitudinal direction.

Furthermore, when the unitary body is elongate in a longitudinal direction between two opposing ends, preferably at least one of the ends comprises an end surface oriented transversely to the longitudinal direction and a bevel surface at an obtuse angle to the end surface so as to be arranged to abut a bevel cut end of a pipe section when the end surface abuts the outer side of the pipe section to gauge an inclination of the bevel cut end.

When the reference edge is oriented in the longitudinal direction along one side of the body, preferably a measurement scale is provided in the longitudinal direction along one side of the body opposite from said at least one reference edge.

Preferably at least one advance cut indicating line intersects the measurement scale corresponding to a prescribed bevel angle of a pipe end cut.

The second gauge portion may further comprise a line of weakness at a prescribed third distance from said at least one reference edge corresponding to an alternative maximum cap height of the weld relative to the outer surface of the pipe sections, such that a section of the second gauge portion between the prescribed second and third distances can be readily separated from the gauge.

According to a second aspect of the present invention there is provided a method of measuring if an external profile of a weld between two abutted pipe sections is between a prescribed minimum cap height and a prescribed maximum cap height, the method comprising:
  providing a gauge comprising a unitary body having at least one reference edge, a first gauge portion in fixed relation to said at least one reference edge at a prescribed first distance from said at least one reference edge corresponding to the prescribed minimum cap height, and a second gauge portion in fixed relation to said at least one reference edge at a prescribed second distance from said at least one reference edge corresponding to the prescribed maximum cap height;
  abutting at least a portion of said at least one reference edge along the outer surface of at least one of the pipe sections such that the first gauge portion is aligned with the weld;
  identifying if the first gauge portion engages the weld;
  abutting at least a portion of said at least one reference edge along the outer surface of at least one of the pipe sections such that the second gauge portion is aligned with the weld; and
  identifying if the second gauge portion engages the weld.

When the unitary body is elongate in a longitudinal direction between two opposing ends and at least one of the ends comprises an end surface oriented transversely to the longitudinal direction and a bevel surface at an obtuse angle to the end surface, the method preferably further comprises abutting the end surface with the outer side of a pipe section and abutting the bevel surface with a bevel cut end of the pipe section to gauge an inclination of the bevel cut end.

When the unitary body is elongate in a longitudinal direction, said at least one reference edge is oriented in the longitudinal direction along one side of the body, and a measurement scale is provided in the longitudinal direction along one side of the body opposite from said at least one reference edge, preferably the method includes abutting the measurement scale along the outer side of a pipe section prior to cutting the pipe section in length.

When the gauge comprises at least one advance cut indicating the measurement scale corresponding to a prescribed bevel angle of a pipe end cut, the method preferably further comprises cutting the pipe section to form a bevel cut end in alignment with said at least one advance cut indicating line.

When the second gauge portion further comprises a line of weakness at a prescribed third distance from said at least one reference edge corresponding to an alternative maximum cap height of the weld relative to the outer surface of the pipe sections, the method may further include separating a section of the second gauge portion between the prescribed second and third distances from the gauge.

Some embodiments of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
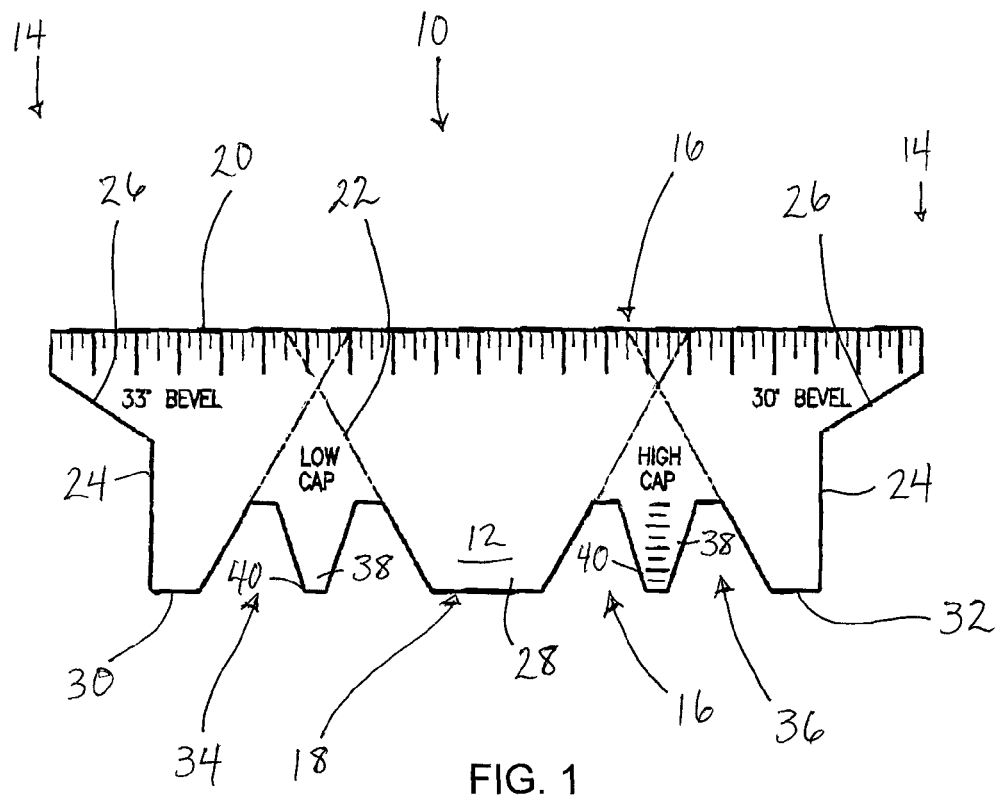
FIG. 1 is a front elevational view of a first embodiment of the gauge.
Figure 2:
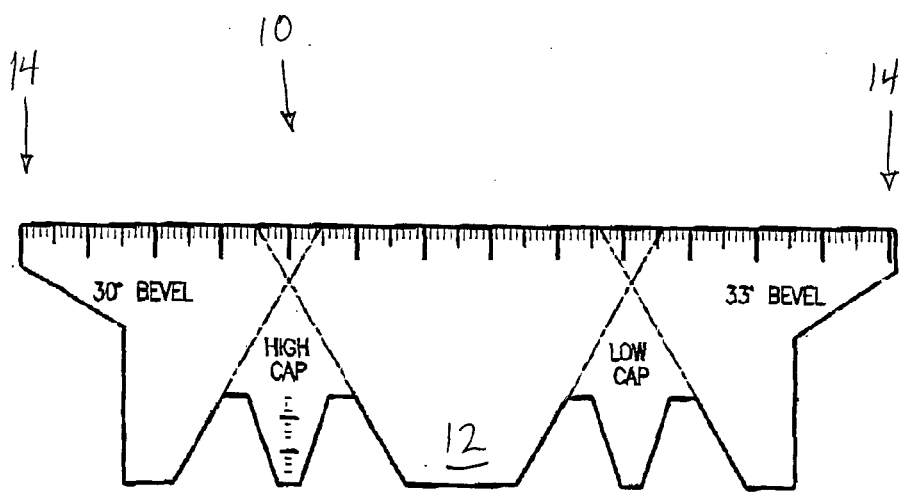
FIG. 2 is a rear elevational view of the gauge according to FIG. 1.
Figure 3:
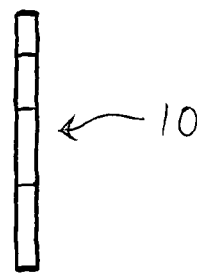
FIG. 3 is an end view of the gauge according to FIG. 1.
Figure 4:
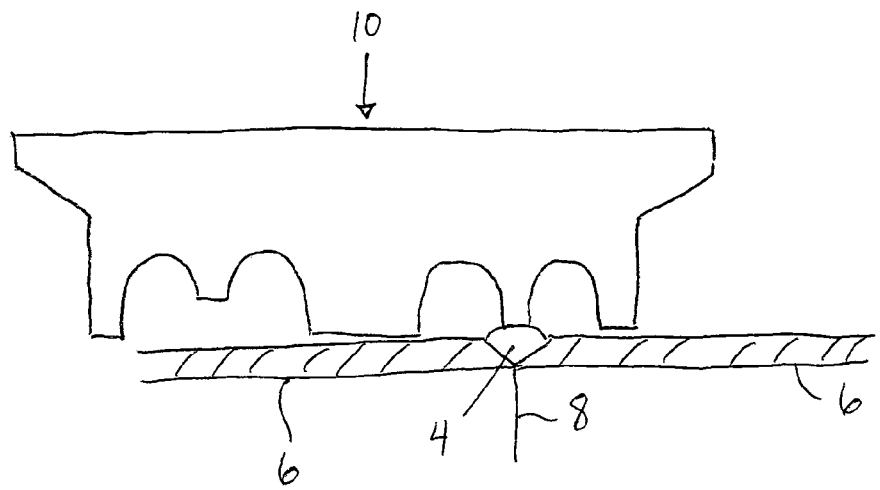
FIG. 4 is an elevational view of the gauge according to FIG. 1 when measuring a minimum cap height.
Figure 5:
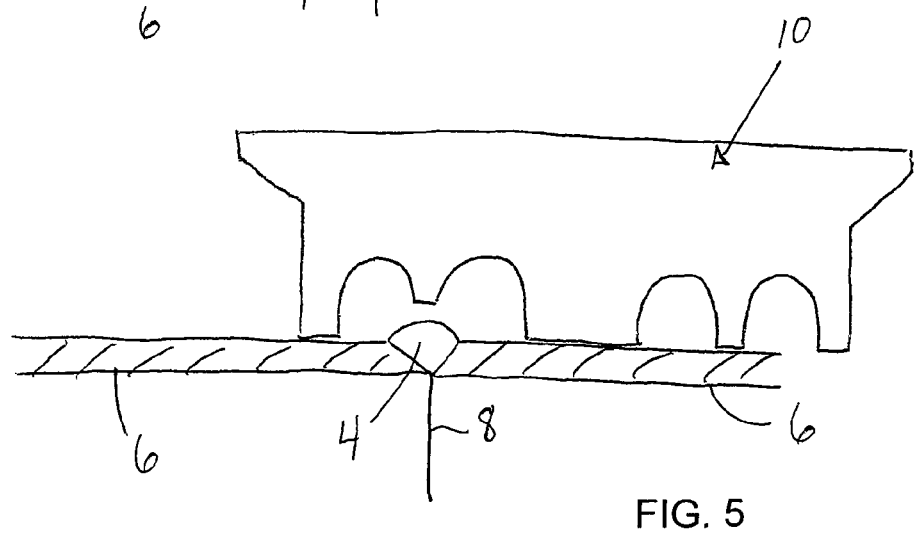
FIG. 5 is an elevational view of the gauge according to FIG. 1 when measuring a maximum cap height.
Figure 6:
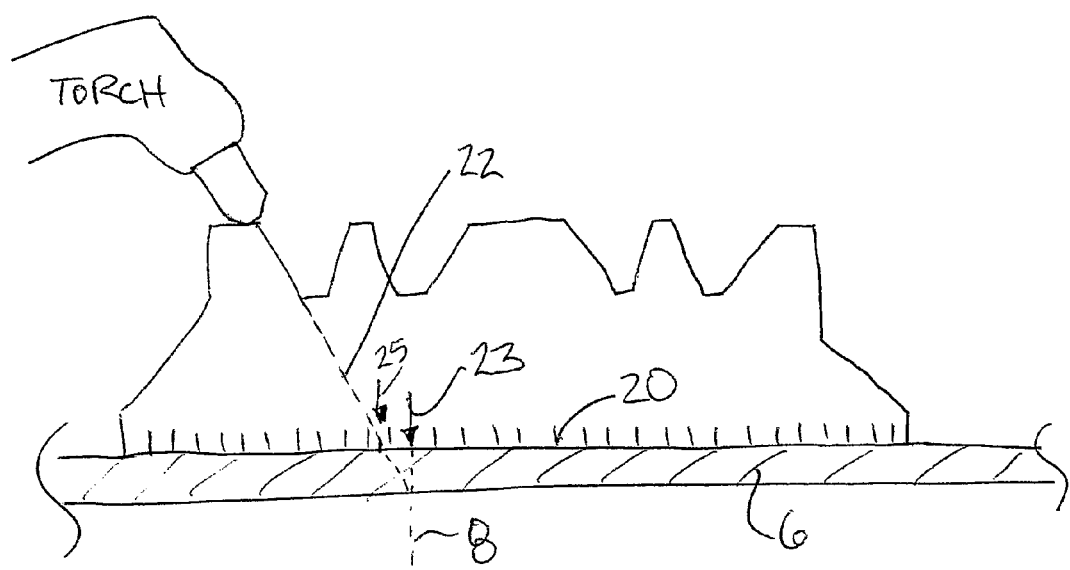
FIG. 6 is an elevational view of the gauge according to FIG. 1 when measuring an advance cut.
Figure 7:
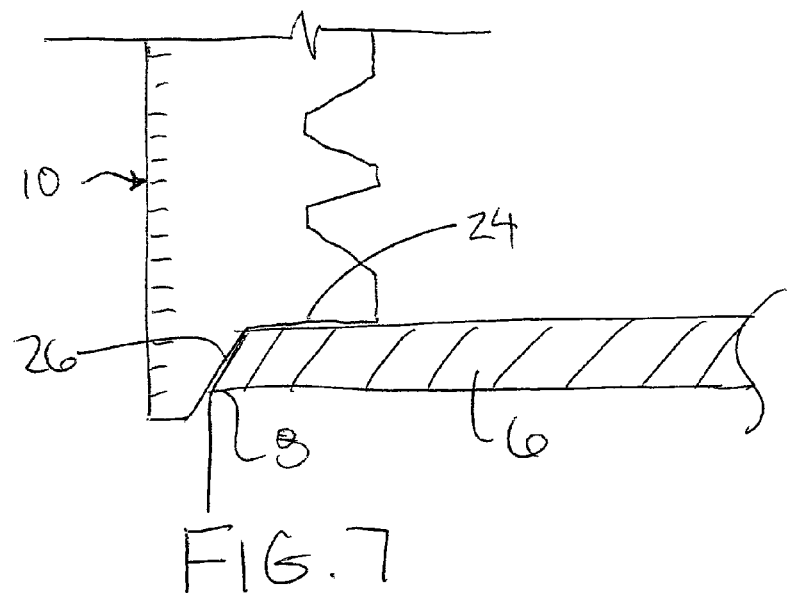
FIG. 7 is an elevational view of the gauge according to FIG. 1 when measuring a bevel at a cut end of a pipe section.

Referring to the accompanying figures, there is illustrated a gauge 10 for use in measuring i) a weld 4 between two abutted pipe sections 6 with regard to cap height, ii) a bevel inclination at the cut end 8 of one pipe section, and iii) an advanced cut location at the exterior of a pipe section to produce a finished cut location spaced longitudinally along the pipe section.

The gauge generally comprises a single unitary body formed of a single piece of a singular material which is seamless and integral throughout. For example, the body 12 of the gauge 10 is cut from a flat metal plate so as to be elongate in a longitudinal direction between two opposing ends 14 of the body. Two sides 16 are generally parallel to one another and span in the longitudinal direction at opposite sides between the two ends 14. A first one of the sides 16 defines a reference edge 18 for abutment with the outer surfaces of two pipe sections when measuring the cap height of a weld.

The other side is a measurement edge including a scale 20 therealong in imperial units along one side of the plate and in metric units on the other side of the plate for use in measuring an advance cut. The advance cut is indicated by a plurality of advance cut lines 22 on opposing planer surfaces of the body typically at two prescribed inclinations in laterally opposing directions for each inclination.

One set of lines is offset from vertical in both longitudinally opposed directions at an inclination from vertical which represents a bevel at the end of a pipe as manufactured for that industry which represents an ideal bevel. In the oil field industry, the bevel is typically 30 degrees from a plane oriented perpendicular to the long axis of the pipe. A second set of advanced cut lines 22 in the instance of an oilfield application is oriented at a 33 degree bevel which is still within a permissible bevel range but which is considered to be easier for pipe welders to weld.

The advanced cut lines 22 intersect the scale 20 along the measurement edge at the desired bevel inclination from a vertical axis intersecting the longitudinal direction at right angles. Each line intersects the measurement scale such that the user can measure the appropriate distance between the point of intersection of the advance cut line and a desired marking 23 on the exterior of the pipe to indicate the finished end of the cut pipe.

If a 30 degree bevel is desired for example with a mark on the outside of the pipe indicating the desired finished cut length of the pipe, the measurement edge of the gauge is abutted with the outside of the pipe and aligned in the longitudinal direction of the pipe such that the point of intersection of the 30 degree advanced cut line with the measurement edge is positioned at a longitudinal space from the mark 23 on the exterior of the pipe at a distance corresponding to the pipe thickness. A second mark 25 is formed on the exterior of the pipe at the intersection of the advanced cut line. Using a cutting torch at the appropriate bevel inclination from the second marking outward towards the first marking will result in the pipe being cut with the appropriate bevel terminating at the desired finished end cut corresponding to the first mark.

The two opposed ends 14 of the gauge are suitably notched to define a recessed end surface 24 recessed inwardly from the end of the tool so as to be oriented perpendicularly to the longitudinal direction for abutment with the outside surface of a pipe when measuring the bevel. A second surface 26 indicating the bevel is oriented at an obtuse angle to the end surface 24 such that the second surface 26 is inclined from the longitudinal direction corresponding to the desired bevel inclination. As the bevel is a measurement of the inclination from the plane perpendicular to the long axis of the pipe, the second surface 26 is at an angle to the end surface 24 corresponding to 90 degrees plus the desired bevel angle.

For example, the two surfaces are 120 degrees apart for a 30 degree bevel which corresponds to 90 degrees plus the desired 30 degree bevel measurement. To measure that the bevel is within prescribed limits, the second inclined surface 26 is compared to the bevel inclination at the cut end of a pipe section when the end surface 24 is abutted with the exterior of the pipe.

In some instances, the bevel at one end of the tool corresponds to the lowest prescribed limit for a bevel while the other end corresponds to a highest prescribed bevel permitted. The user can then verify that the bevel at the end of the pipe is between the high and low limits.

Or preferably, one of the bevels is located at the optimum bevel from the manufacturer for example 30 degrees for oil and gas applications while the other represents a higher more preferred bevel for welding which may be 33 degrees in the oilfield industry.

The reference edge 18 is divided into a central portion 28, a first end portion 30 and a second end portion 32 in which all three portions are longitudinally spaced apart from one another in the long direction of the gauge body with the central portion being longitudinally centered between the two edge portions. The edge surfaces are all collinear with one another in the longitudinal direction.

Between the first end portion 30 and the center portion there is defined a first cap height gauge area 34. Likewise a second cap height gauge area 36 is defined between the central portion 28 and the second end portion 32. Each gauge area is defined as an edge of the body which is recessed inwardly towards the opposing side edge 16 so as to be cut back and recessed in relation to the reference edge 18.

A gauge portion 38 is centrally located within each gauge area where the edge of the plate body protrudes outwardly towards the reference edge 18 and away from the scale 20. The gauge portion 38 is centrally located within the gauge area so that a remaining portion of the recessed edge is located between the gauged portion and each of the adjacent central or edge portions on either side of the gauge area respectively.

According to some embodiments as shown in the accompanying figures, each gauge portion 38 protrudes towards the reference edge to a respective free edge 40 of the gauge portion which is initially substantially aligned with the reference edge prior to use of the tool. Depending upon the desired use of the tool, the user of the tool performs a one-time customization of the tool to suit their particular job area. For example, when welding a particular type of pipe in the oil and gas industry, the weld between two abutted pipe sections, must have a height measured radially outward from the outer surface of the pipe, defined as the cap height, which falls between prescribed minimum and maximum cap height values. The user uses a grinder or other cutting tool to cut back each of the gauge portions 38 to correspond to the minimum and maximum cap heights respectively.

Accordingly, the first gauge portion is cut so that the resultant free edge 40 is located at a prescribed first distance recessed inward from the reference edge corresponding to a minimum cap height of the weld relative to the outer surface of the pipe sections. Similarly, the second gauge portion is cut so that its free edge 40 is recessed inwardly from the referenced edge at a second prescribed distance corresponding to a maximum cap height of the weld relative to the outer surface of the pipe sections. For example in the oilfield industry, the first gauge portion may be located at 2 millimeters from the reference edge while the second gauge portion is located at 4 millimeters from the reference edge as measured within the plane of the tool body in a direction perpendicular to the reference edge in the longitudinal direction.

The tool is used for gauging the cap height of a weld by initially abutting the reference edge to the outer surface of the pipe sections so that the first gauge portion is aligned with the weld. This corresponds to the first end portion of the reference edge abutting one pipe section and the center portion of the reference edge abutting the other pipe section. If the first gauge portion engages the weld so that the tool effectively rocks on the weld, the first criteria for a good weld has been met as the weld has met the minimum cap height requirement.

The user must then abut the reference edge along the outer surface of the pipes such that the second gauge portion is aligned with the weld corresponding to the center portion 28 of the reference edge abutting one pipe section and the second end portion 32 of the reference edge abutting the other pipe section. If the second gauge portion does not engage the weld, then the weld has satisfied the second criteria for a good weld by not exceeding the maximum cap height.

According to an alternative embodiment, the free end of the first gauge portion is already cut or located in fixed relation to the reference edge at the prescribed first distance from the reference edge which corresponds to a commonly used minimum cap height of the weld relative to the outer surface of the pipe sections. Similarly, the free end of the second gauge portion can be already cut or otherwise located in fixed relation to the reference edge at the prescribed second distance from the reference edge which corresponds to a commonly used maximum cap height. In this instance one or both of the gauge portions is provided with a line of weakness where the material thickness is reduced across the full width of the gauge portion in the longitudinal direction parallel to the reference edge. Each of the lines of weakness is located at an auxiliary prescribed distance from the reference edge corresponding to an alternative minimum or maximum cap height of the weld respectively. Accordingly if the user requires gauging welds at the alternative cap heights, the corresponding section of the gauge portion is readily separated or severed from the gauge at the line of weakness to reset the prescribed distance of the gauge height to the alternative limit. The section of the second gauge portion being removed corresponds to the section which is between the auxiliary distance and the corresponding first or second prescribed distance depending upon which gauge portion is being adjusted.

Figure 8:
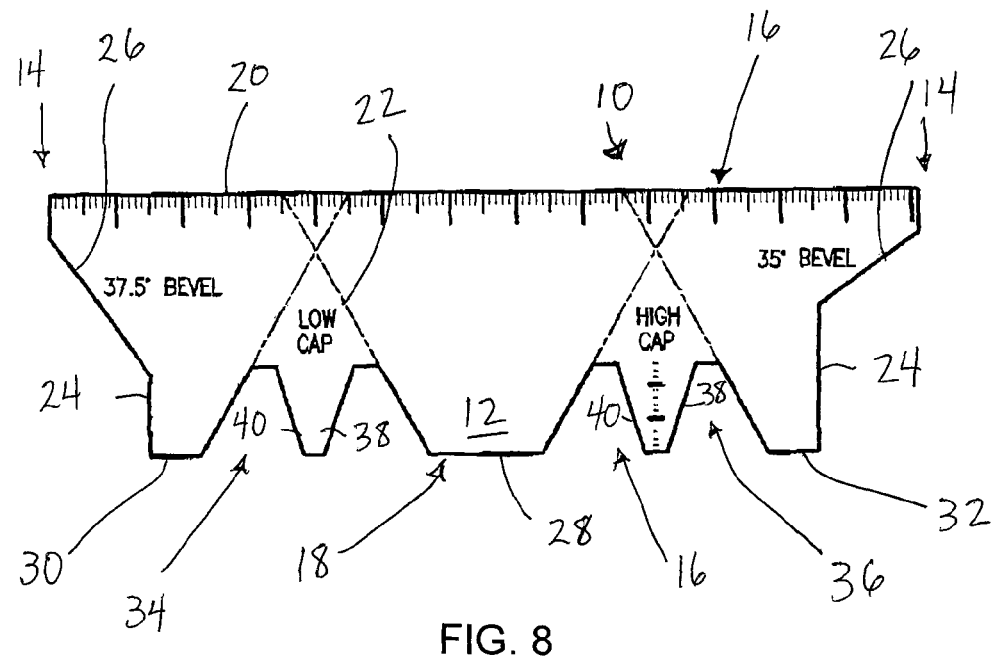
FIG. 8 is a front elevational view of a second embodiment of the gauge.
Figure 9:
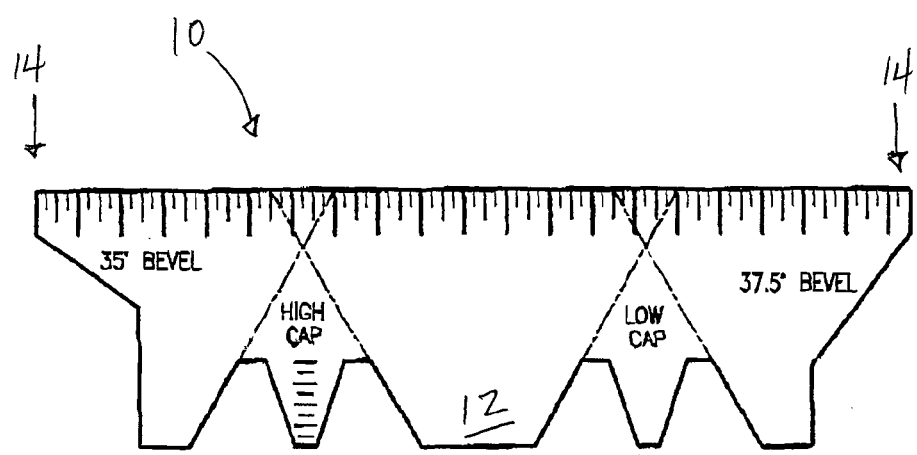
FIG. 9 is a rear elevational view of the gauge according to the second embodiment of FIG. 8.

In further embodiments, the bevels and advanced cut lines may be oriented at different inclinations which are suited for other industries such as the embodiment of FIGS. 8 and 9 which is suited for the construction industry.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A gauge for use in measuring a weld between two abutted pipe sections, the gauge comprising:
   a unitary body comprising:
       a reference edge comprising a plurality of reference edge portions which are co-linear with one another on the unitary body at spaced apart positions in a longitudinal direction of the reference edge so as to be arranged for abutment along an outer surface of at least one of the pipe sections;
       a first gauge portion on the unitary body so as to be in fixed relation to the reference edge and arranged to be located at a prescribed first distance from the reference edge corresponding to a minimum cap height of the weld relative to the outer surface of the pipe sections, the first gauge portion being located between a respective first pair of the reference edge portions in the longitudinal direction such that the reference edge portions of said second pair are arranged to abut respective ones of the two abutted pipe sections when the first gauge portion is aligned with the weld;
       a second gauge portion on the unitary body so as to be in fixed relation to the reference edge and arranged to be located at a prescribed second distance from the reference edge corresponding to a maximum cap height of the weld relative to the outer surface of the pipe sections, the second gauge portion being located between a respective second pair of the reference edge portions in the longitudinal direction such that the reference edge portions of said second pair are arranged to abut respective ones of the two abutted pipe sections when the second gauge portion is aligned with the weld.

2. The gauge according to claim 1 wherein the unitary body comprises a single flat plate formed of a singular, integral and seamless material.

3. The gauge according to claim 1 wherein the unitary body is elongate in the longitudinal direction of the reference edge and the first and second gauge portions are spaced apart from one another in the longitudinal direction.

4. The gauge according to claim 1 wherein the unitary body is elongate in the longitudinal direction between two opposing ends, and wherein at least one of the ends comprises an end surface oriented transversely to the longitudinal direction and a bevel surface at an obtuse angle to the end surface so as to be arranged to abut a bevel cut end of a pipe section when the end surface abuts the outer side of the pipe section to gauge an inclination of the bevel cut end.

5. The gauge according to claim 1 wherein a measurement scale is provided in the longitudinal direction along one side of the body opposite from the reference edge.

6. The gauge according to claim 5 wherein there is provided at least one advance cut indicating line intersecting the measurement scale corresponding to a prescribed bevel angle of a pipe end cut.

7. A gauge for use in measuring a weld between two abutted pipe sections, the gauge comprising:
  a unitary body comprising:
    at least one reference edge arranged for abutment along an outer surface of at least one of the pipe sections;
    a first gauge portion in fixed relation to said at least one reference edge and arranged to be located at a prescribed first distance from said at least one reference edge corresponding to a minimum cap height of the weld relative to the outer surface of the pipe sections;
    a second gauge portion in fixed relation to said at least one reference edge and arranged to be located at a prescribed second distance from said at least one reference edge corresponding to a maximum cap height of the weld relative to the outer surface of the pipe sections;
  wherein the second gauge portion further comprises a line of weakness at a prescribed third distance from said at least one reference edge corresponding to an alternative maximum cap height of the weld relative to the outer surface of the pipe sections, such that a section of the second gauge portion between the prescribed second and third distances can be readily separated from the gauge.

8. A method of measuring if an external profile of a weld between two abutted pipe sections is between a prescribed minimum cap height and a prescribed maximum cap height, the method comprising:
  providing a gauge comprising a unitary body having at least one reference edge, a first gauge portion in fixed relation to said at least one reference edge at a prescribed first distance from said at least one reference edge corresponding to the prescribed minimum cap height, and a second gauge portion in fixed relation to said at least one reference edge at a prescribed second distance from said at least one reference edge corresponding to the prescribed maximum cap height;
  abutting at least a portion of said at least one reference edge along the outer surface of at least one of the pipe sections such that the first gauge portion is aligned with the weld;
  identifying if the first gauge portion engages the weld;
  abutting at least a portion of said at least one reference edge along the outer surface of at least one of the pipe sections such that the second gauge portion is aligned with the weld; and
  identifying if the second gauge portion engages the weld.

9. The method according to claim 8 including providing the gauge with the unitary body comprising a single flat plate formed of a singular, integral and seamless material.

10. The method according to claim 8 wherein the unitary body is elongate in a longitudinal direction between two opposing ends and wherein at least one of the ends comprises an end surface oriented transversely to the longitudinal direction and a bevel surface at an obtuse angle to the end surface, the method further comprising abutting the end surface with the outer side of a pipe section and abutting the bevel surface with a bevel cut end of the pipe section to gauge an inclination of the bevel cut end.

11. The method according to claim 8 wherein the unitary body is elongate in a longitudinal direction, said at least one reference edge is oriented in the longitudinal direction along one side of the body, and a measurement scale is provided in the longitudinal direction along one side of the body opposite from said at least one reference edge, and wherein the method includes abutting the measurement scale along the outer side of a pipe section prior to cutting the pipe section in length.

12. The method according to claim 11 wherein the gauge comprises at least one advance cut indicating line intersecting the measurement scale corresponding to a prescribed bevel angle of a pipe end cut, the method further comprising cutting the pipe section to form a bevel cut end in alignment with said at least one advance cut indicating line.

13. The method according to claim 8 wherein the second gauge portion further comprises a line of weakness at a prescribed third distance from said at least one reference edge corresponding to an alternative maximum cap height of the weld relative to the outer surface of the pipe sections, and wherein the method includes separating a section of the second gauge portion between the prescribed second and third distances from the gauge.

14. A gauge for use in measuring a weld between two abutted pipe sections, the gauge comprising:
  a unitary body comprising:
    a reference edge along a first side of the unitary body which is arranged for abutment along an outer surface of at least one of the pipe sections;
    at least one gauge portion on the unitary body so as to be in fixed relation to the reference edge, said at least one gauge portion being located at a prescribed distance from the reference edge corresponding to a prescribed cap height of the weld relative to the outer surface of the pipe sections;
    a measurement scale along a second side of the unitary body different from the reference edge; and
    an advance cut indicating line intersecting the measurement scale corresponding to a prescribed bevel angle of a pipe end cut.

* * * * *